United States Patent Office 2,835,608
Patented May 20, 1958

2,835,608

PROCESS OF PREPARING URANIUM-IMPREGNATED GRAPHITE BODY

Manuel A. Kanter, Park Forest, Ill., assignor to the United States of America as represented by the United States Atomic Energy Commission No Drawing. Application June 22, 1950
Serial No. 169,790

6 Claims. (Cl. 117—65)

The present invention relates to processes for the fabrication of fuel elements suitable for use in a neutronic reactor operating at high temperature for the production of power. More particularly, the present invention relates to the fabrication of graphite bodies containing uranium uniformly distributed therein.

In power-producing piles operating at temperatures elevated in excess of 800° C., the fuel elements employed therein must be made of moderator materials in which there will not be a building-up of high thermal stresses and, in addition thereto, the neutronically reactive or fissionable material employed therein must be uniformly distributed in certain definite concentrations throughout the moderator material, such as graphite.

The instant invention therefore relates to a process for the fabrication of graphite-uranium bodies which are readily reproducible with respect to the amount of uranium distributed in said graphite and uniform with respect to said distribution.

In preparing coherent bodies of graphite containing uranium compounds uniformly distributed therein in the form of a solution in water or organic solvent, it has frequently been observed that even if uniform distribution of uranium is initially attained by any one of several processes, the initial uniform distribution is adversely affected during subsequent heating to remove solvent owing to the tendency of the uranium to migrate to the surface of the graphite, esepcially if the uranium salt concentration is high.

It is therefore an object of this invention to provide a process for the fabrication of a graphite-uranium body wherein the amount of uranium distributed in said graphite and the uniformity of said distribution are both readily reproducible and thermally stable. Ultimately, the present invention deals with a process for drying coherent bodies of graphite, the pores of which are uniformly permeated throughout their entire cross-section with a solution of a uranium compound, which is readily converted by thermal means to a compound of uranium which is nonvolatile and thermally stable at elevated temperatures.

A further object of this invention is to provide a process for removal of solvent from a solution of a uranium compound uniformly permeating graphite.

A further object of this invention is to provide a process for the removal of solvent water from uranyl nitrate hexahydrate solutions contained in and uniformly interpenetrating the pores within a coherent graphite body.

A further object of this invention is to provide a process for removal of the solvent from the uranium compound solution uniformly permeating graphite, wherein said solvent removal is unaccompanied by migration of the uranium compound toward the surface of the graphite body.

Other objects and advantages of the instant invention will be apparent upon further examination of this specification and consideration of the details set forth hereinafter which are essential to the successful fabrication of the subject graphite-uranium composition.

I have discovered that fabrication of a uranium-containing graphite body, wherein uranium is uniformly distributed therein, can be attained by employing the critical drying conditions for removal of solvent in accordance with the instant invention. Throughout the instant specification, the term "drying" denotes and is limited to the removal of solvent from a solution containing a uranium salt dissolved therein but, in the case of an aqueous solution, does not include removal of water of hydration of said salt. Water is the preferred solvent for uranium salt used to interpenetrate the pores of the graphite, especially in processes employing the vacuum technique, hereinafter defined, for the results obtained by employing aqueous solutions of uranium are more reproducible. Organic solvents for uranium salts such as ether, acetone and hexone can also be employed, preferably in a process which incorporates a refluxing technique hereinafter defined.

I have discovered that if graphite, which contains a uranium salt uniformly distributed therein by treatment of said graphite after impregnation followed by drying in accordance with the process of this invention, is fired at high temperature, the uranium remains uniformly distributed throughout the graphite body. The uranium does not migrate to the graphite surfaces during either the drying or firing step. The critical conditions for drying uranium-impregnated graphite in accordance with the instant invention comprise essentially removing the solvent from said graphite impregnated body under substantially normal atmospheric conditions of temperature and pressure.

In a preferred embodiment, the solvent of the uranium compound solution which uniformly permeates the coherent graphite body is removed therefrom by contact with a stream of inert gas such as helium or argon, while under substantially normal atmospheric conditions of temperature and pressure. Under such condtions any water of hydration associated with the uranium compound remains substantially unaffected, but any solvent present is removed sufficiently to permit subsequent firing of the treated graphite body at high temperature without disturbing the uniform distribution of uranium within the graphite.

In another embodiment, the solvent may be removed from the graphite body uniformly infused with a solution containing a uranium salt by placing said graphite in a vessel maintained under substantially normal atmospheric conditions of temperature and pressure and which contains a desiccant substance, such as anhydrous calcium sulfate or phosphorus pentoxide. When this embodiment is employed, the drying period is approximately tenfold that required for drying a similarly impregnated graphite body under substantially normal atmospheric conditions of temperature and pressure in contact with a stream of inert gas. The resultant product, containing a uranium salt, e. g. uranyl nitrate hexahydrate, uniformly distributed throughout the graphite, is then fired in an inert gas, such as helium, at temperatures suitably elevated, e. g. between 800° and 1400° C. for conversion of the impregnated uranium to a compound which is nonvolatile and stable at elevated temperatures. The preferred firing temperature for graphite impregnated with uranyl nitrate hexahydrate is 800° C., for at this temperature, triuranium octaoxide, $U_3O_8$, is formed. It is relatively stable and nonvolatile at elevated temperatures.

In fabricating graphite-uranium bodies having a maximum uranium content, it is preferable to employ uniformly porous graphite having a low density, e. g. between 1.36 g./cm.$^3$ and 1.38 g./cm.$^3$. Up to 19% by weight $U_3O_8$ in the final product can be attained by a single impregnation of graphite followed by the other steps of the process of this invention; however, between 2 and 3% by weight uranium as $U_3O_8$ or about 0.04 g. of $U_3O_8$ per cubic centimeter of graphite is suitable for fabricated fuel elements.

Illustrative of the process of this invention, hollow cylinders of graphite are fabricated by cutting graphite blocks slightly larger than the outside dimensions necessary for the final product. These blocks are then drilled and reamed to the proper inner diameters and machined on a lathe to the required outer dimensions. Any loose graphite powder from the machining operation is removed by boiling the graphite in water for thirty minutes and drying in inert gas, e. g. helium, at an elevated temperature. Removal of graphite powder is particularly desirable, because if such graphite powder goes into the impregnating solutions, it will reduce the useful life of these solutions considerably and preclude their multiple reuse for the purposes of this invention. In addition to inhibiting the collection of graphite particles in the impregnating solution, there is also some indication that pretreatment of graphite, i. e. by immersion in boiling water or nitric acid solution followed by drying in helium, facilitates the impregnation of graphite because the graphite appears to be somewhat "activated" (i. e., more easily permeated by aqueous solutions of uranium salt) by the heating step. However, such activation is not mandatory for impregnation of graphite by the vacuum technique which is disclosed hereinafter.

The graphite is suitably impregnated with a solution of a uranium compound which is readily soluble in either water or organic solvents and which is readily converted to a compound which is relatively stable at elevated temperatures. An example of a suitable compound is uranyl nitrate, which can be employed in a wide range of concentrations. The preferred range is 0.5 to 1 M. Either of two methods can be employed for impregnating graphite with uranyl nitrate solutions. The preferred technique is a vacuum process whereby up to 97% of the void volume in the graphite can be filled with the impregnating salt solution. The void volume is calculated from the density of natural graphite and the weight of the sample in air and water. The vacuum method has the further advantage in that higher weight gains with respect to uranium content can be attained and the method shows greater reproducibility in comparison with the alternative refluxing technique described hereinafter.

In order to attain the initial uniform distribution of uranium salt throughout the graphite prior to drying the impregnated body, the preferred vacuum technique for impregnation was adopted. The graphite sample is placed in a vessel which is then evacuated to a low pressure, e. g. a pressure of less than 1 mm. of mercury. Without breaking this vacuum, an aqueous uranyl nitrate solution is placed in the vessel until the sample becomes substantially immersed therein. The system is later opened to the atmosphere thereby forcing the aqueous solution within the pores or interstices in the graphite by atmospheric pressure. Before separation of impregnated graphite from excess solution, the solution is preferably refluxed at the boiling point a period of time, e. g. for thirty minutes, to further enhance impregnation and so that when the sample is then removed from the impregnating solution enough heat is retained from the boiling solution to initiate drying in the graphite.

Immediately thereafter, the graphite is dried in a manner in which there is no migration of the uranium compound to the graphite surfaces. In accordance with this invention, the solvent is removed from the uranium compound distributed in the graphite under conditions that will not cause migration of the hydrated uranium salt. This is effected by maintaining the impregnated graphite body under substantially normal conditions with respect to pressure and temperature during the drying process. Normal atmospheric pressures will suffice and the temperature should be maintained between 20° and 30° C. Suitable conditions are obtained either by placing the graphite, previously impregnated with a solution of uranium salt, in a vessel containing a desiccant material such as anhydrous calcium sulfate or phosphorus pentoxide or alternatively and preferably drying said graphite body under substantially normal atmospheric conditions of temperature and pressure while in contact with a stream of inert gas, such as helium or argon. By this latter means, drying is completed in a relatively short time, e. g. within four hours.

After the solvent has been substantially removed in accordance with the above procedure and preferably immediately after said removal, the graphite body is fired at an elevated temperature for conversion of the uranium compound to a relatively stable compound of uranium which is relatively nonvolatile at pile temperature.

The following tabular data illustrate the critical nature of the drying and firing or heating procedures with respect to uniform distribution of uranium in graphite samples. The samples used in the following tests were made from low density (1.36 g./cm.$^3$) graphite which had been pretreated in boiling water for thirty minutes and thereafter dried by firing at high temperature about 800° C. in a helium atmosphere. After pretreatment of the graphite and evacuation of the chamber containing the graphite, the graphite was impregnated by a vacuum technique, i. e., by adding an aqueous solution of uranyl nitrate hexahydrate thereto while maintaining the vacuum, releasing the vacuum, and later separating the graphite from the excess aqueous solution. The resultant samples were treated as shown in Table I.

TABLE I

*Effect of drying and firing procedures on the distribution of uranium in graphite samples*

| Sample No. | Drying and Firing Technique Used | Resulting Uranium Distribution (as determined by X-ray shadowgraph) |
| --- | --- | --- |
| 1 | No drying; placed immediately in furnace at 800° C. | Nonuniform. |
| 2 | Dried in desiccator 24 hours | Uniform. |
| 3 | Dried in desiccator 24 hours; inserted in furnace at room temperature, and heated to 800° C. in two hours. | Do. |
| 4 | Dried in desiccator 24 hours; inserted in furnace at room temperature, and heated to 800° C. in 1 hour. | Almost uniform. |
| 5 | Dipped in NH$_4$OH; dried in desiccator 24 hours; inserted in furnace at room temperature, and heated to 800° C. in 2 hours. | Nonuniform. |
| 6 | Inserted in furnace at room temperature; allowed to remain in a helium stream at room temperature for 4 hours, and then brought up to 800° C. in 1 hour. | Uniform. |
| 7 | Dried at room temperature in desiccator for 48 hours, placed in furnace at 800° C. | Do. |

The drying step of the present invention followed by a firing step can be combined with other impregnating techniques, e. g. the refluxing technique, in which preferably after pretreatment of the graphite with boiling water and drying in the presence of an inert gas, the graphite is refluxed for a period of time, e. g., about thirty minutes, in a boiling aqueous solution containing a uranium salt, e. g. uranyl nitrate. After refluxing the graphite is separated, dried and fired. The uranium content of the graphite product varies directly with the concentration of uranium salt contained in the solution. However, more reproducible results are obtained by the vacuum technique as shown by comparison in Table II with the results obtained by the refluxing technique.

TABLE II

*Comparison of the impregnation of graphite by the vacuum and by the refluxing techniques*

Percent gain in weight $$\frac{\text{Wt. } U_3O_8 \times 100}{\text{Initial wt. of graphite}}$$

| Vacuum Technique | Refluxing Technique |
|---|---|
| [1] 3.83 | [1] 3.25 |
| [1] 3.88 | [1] 3.46 |
| [1] 3.93 | [1] 3.29 |
| [1] 3.91 | [1] 3.14 |
| [1] 3.99 | [1] 3.35 |
| [1] 3.81 | ---------- |
| [1] 3.91 | ---------- |
| [2] 6.25 | [2] 5.50 |
| [2] 6.27 | [2] 5.25 |
| [2] 6.27 | [2] 5.41 |

[1] Fuel tube sections of low density (1.36 g./cm.³) graphite impregnated with an aqueous solution containing 28 g. of uranyl nitrate hexahydrate per 100 ml. of solution.

[2] Fuel tube sections of low density (1.36 g./cm.³) graphite impregnated with an aqueous solution containing 45 g. of uranyl nitrate hexahydrate per 100 cc. solution.

EXAMPLE I

Graphite cylinders measuring 6" in length and 1.5" outer diameter were formed on a lathe from low density (1.36 g./cm.³) graphite and drilled and reamed to an inside diameter measuring 0.875". Any graphite powder from the machining operation was removed by boiling the graphite cylinders in water for thirty minutes and drying in helium at an elevated temperature (ca. 800° C.). The samples were placed in a vessel which was then evacuated to a pressure between 0.1 and 0.4 mm. of mercury. Without breaking the vacuum, an aqueous solution containing 45 grams of uranyl nitrate hexahydrate per 100 ml. was admitted to the vessel in sufficient amount to completely cover the samples which remained immersed in the impregnating solution for approximately five minutes. The system was then opened to the atmosphere whereby part of the solution was forced by atmospheric pressure into the voids within the graphite bodies. The uranyl nitrate solution was heated and maintained at reflux temperature for approximately thirty minutes after which the samples were removed from contact with the excess unadsorbed solution. The samples retained enough heat from the refluxing to initiate drying of excess water. After removal from the impregnating bath and draining the excess solution from the samples, the samples were placed in a vessel containing anhydrous calcium sulfate for about fifty hours. Other similarly treated samples were dried at room temperature for about five hours while in contact with a stream of helium gas. Immediately following removal of solvent water by the anhydrous calcium sulfate desiccant or the stream of helium, the samples were placed in a quartz tube and heated at 800° C. in a Burrell furnace for from fifteen to thirty minutes in an atmosphere of helium.

The $U_3O_8$ content in these preparations ranged between 3.5 percent by weight and 5 percent by weight with the distribution of uranium throughout the graphite being substantially uniform.

The foregoing detailed description of the instant invention is capable of extensive variation obvious to those skilled in the art and the scope of the invention is to be limited only by the scope of the appended claims.

What is claimed is:

1. A method of preparing a coherent body of graphite containing an oxide of uranium uniformly distributed in said body comprising impregnating a body of graphite having substantially uniform porosity and low density with an aqueous solution of uranyl nitrate hexahydrate, removing solvent water from said body under substantially normal atmospheric conditions of temperature and pressure, and thereafter heating said impregnated graphite body in the presence of inert gas at a temperature between 800 and 1400° C. to convert said uranyl nitrate hexahydrate to said oxide of uranium.

2. A method of preparing a coherent body of graphite containing a uniformly distributed compound of uranium in said graphite comprising placing a coherent uniformly porous low density body of graphite in a vessel, applying a vacuum to said vessel, introducing an aqueous solution of uranyl nitrate hexahydrate into said vessel until said graphite body is immersed therein, opening the system to atmospheric pressure whereby part of said uranyl nitrate solution is forced into the voids contained in said graphite, withdrawing the unadsorbed uranyl nitrate solution from contact with the treated graphite, removing the solvent water from the resultant uranyl nitrate-impregnated graphite body under substantially normal atmospheric conditions of temperature and pressure, and thereafter heating the body in an inert atmosphere at a temperature between 800 to 1400° C. to convert said uranyl nitrate hexahydrate to uranium oxide.

3. The method of claim 2 wherein said solvent water is removed from the uranyl nitrate-impregnated graphite body under substantially normal atmospheric conditions of temperature and pressure by contacting said graphite body with a stream of inert gas.

4. The method of claim 2 wherein removal of said solvent water from said graphite body is effected by maintaining said body under substantially normal atmospheric temperature and pressure in a vessel containing a desiccant.

5. A method of preparing a coherent body of graphite containing a compound of uranium uniformly distributed therein comprising placing in a vessel a coherent body of low density graphite having substantially uniform porosity, applying a vacuum to said vessel, introducing sufficient aqueous solution of uranyl nitrate hexahydrate to immerse said graphite body, opening the system to the atmosphere, heating said uranyl nitrate hexahydrate solution to boiling while in contact with said graphite body, removing excess unadsorbed uranyl nitrate hexahydrate solution from contact with the treated graphite, removing the remaining solvent water from the resultant uranyl nitrate-impregnated graphite under substantially normal atmospheric conditions of temperature and pressure while in contact with a stream of inert gas, and thereafter heating the body in an inert atmosphere at a temperature between 800 to 1400° C. to convert said uranyl nitrate hexahydrate to uranium oxide.

6. The method of claim 5 wherein the concentration of uranyl nitrate hexahydrate in the aqueous solution is between 0.5 and 1M.

References Cited in the file of this patent

UNITED STATES PATENTS

| | | |
|---|---|---|
| 1,799,248 | Reinhardt | Apr. 7, 1931 |
| 1,993,388 | Stockbridge et al. | Mar. 5, 1935 |
| 2,448,685 | Ramadanoff | Sept. 7, 1948 |
| 2,512,362 | Moberly | June 20, 1950 |

OTHER REFERENCES

Noad: Manual of Chemical Analysis, page 248 (1864), pub. by Lovell Reeve & Co., London.

Victor: Heating and Ventilating, page 67, December 1944.

Hackh's Chemical Dictionary, 3rd ed., page 159, Blakiston (1944).

Atomes, vol. 4, pp. 52–3 (1949).